US006266658B1

(12) United States Patent
Adya et al.

(10) Patent No.: US 6,266,658 B1
(45) Date of Patent: Jul. 24, 2001

(54) INDEX TUNER FOR GIVEN WORKLOAD

(75) Inventors: Atul Adya, Bellevue; Sanjay Agrawal, Redmond; Surajit Chaudhuri, Redmond; Vivek R. Narasayya, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/553,070

(22) Filed: Apr. 20, 2000

(51) Int. Cl.[7] ..................................................... G06F 17/30
(52) U.S. Cl. ................................................ 707/2; 1/3; 1/5
(58) Field of Search ........................................ 707/1, 2, 3, 5

(56) References Cited

U.S. PATENT DOCUMENTS

| | | | |
|---|---|---|---|
| 5,913,206 | 6/1999 | Chaudhuri et al. | 707/2 |
| 5,913,207 | 6/1999 | Chaudhuri et al. | 707/2 |
| 5,926,813 | 7/1999 | Chaudhuri et al. | 707/5 |
| 5,950,186 | 9/1999 | Chaudhuri et al. | 707/2 |
| 5,960,423 | 9/1999 | Chaudhuri et al. | 707/2 |
| 6,029,163 | * 2/2000 | Ziauddin | 707/2 |
| 6,105,019 | * 8/2000 | Burrows | 707/2 |

OTHER PUBLICATIONS

"Copending Patent Application Serial No.: 09/087,617, entitled "Index Merging for Database Systems"", Pat. No. 6,169,983, filed May 30, 1998.

"Copending Patent Application Serial No.: 09/139,843, entitled "What–If Index Analysis Utility for Database Systems"", filed Aug. 25, 1998.

Chaudhuri, S., et al., "An Efficient, Cost–Driven Index Selection Tool for Microsoft SQL Server", Proceedings of the 23rd VLDB Conference, Athens Greece, 10 Pages, (1997).

Chaudhuri, S., et al., "AutoAdmin "What–if" Index Analysis Utility", SIGMOD '98 Proceedings of ACM SIGMOD International Conference on Management of Data, vol. 27, Issue 2, 367–378, (Jun., 1998).

* cited by examiner

*Primary Examiner*—Jack Choules
*Assistant Examiner*—Cheryl Lewis
(74) *Attorney, Agent, or Firm*—Watts, Hoffmann, Fisher & Heinke, Co., L.P.A.

(57) ABSTRACT

An index tuning wizard produces a fast and reasonable recommendation identifying database indexes to use given a specified workload. A query optimizer is used to determine the expected usefulness of potential indexes for the specified workload by taking cost of queries in the workload into account. A cost based pruning of indexes is then performed to provide an intermediate set of proposed indexes. Indexes having most benefit based on storage constraints are then selected. The optimizer is then used again, and further pruning is done on a benefits basis. An index is not recommended unless it has a significant impact on the workload.

38 Claims, 8 Drawing Sheets

| COST | $T_1 \diagdown_{Q_1} T_2$ 100 | $T_1 \diagdown_{Q_2} T_4$ 50 |
|---|---|---|
| POSSIBLE INDEXES FOR QUERY | $I_1$ on $T_1$<br>$I_2$ on $T_2$<br>$I_3$ on $T_2$ | $I_1$ on $T_1$<br>$I_4$ on $T_4$ |

FOR $Q_1$ $$\text{weight of } I_1 \text{ for } Q_1 = \frac{|T_1|}{|T_1|+|T_2|} * 100$$

$$\text{weight of } I_2 \text{ for } Q_1 = \frac{|T_2|}{|T_1|+|T_2|} * 100$$

$$\text{weight of } I_3 \text{ for } Q_1 = \frac{|T_2|}{|T_1|+|T_2|} * 100$$

FOR $Q_2$ $$\text{weight of } I_1 \text{ for } Q_2 = \frac{|T_1|}{|T_1|+|T_4|} * 50$$

$$\text{weight of } I_4 \text{ for } Q_2 = \frac{|T_4|}{|T_1|+|T_4|} * 50$$

FIG. 4

501. Let C denote set of candidate indexes proposed for workload W. C = {}.
502. For each query Q in W
503.     Let S = set of all indexable columns of Q
504.     Let T = set of all tables referenced in Q
505.     /* determines single-column indexes */
506.     For each column R.c ∈ S
507.         Let I be a non-clustered index on column R.c
508.         Add (Q, Cost (Q, *current*) * Size (R) / $\Sigma_{t \in T}$ size(t)) to weights-list of index I.
509.         C = C ∪ I
510.     /* determine covering indexes */
511.     For each t ∈ T
512.         Let I be a covering index on t for Q
513.         C = C ∪ I
514. /* compute accurate weights for covering indexes */
515. For each covering index I ∈ C
516.     For each query Q in W where I is potentially relevant
517.         Let I be defined on table R. Let T be set of all tables referenced in Q.
518.         Add (Q, Cost (Q) * Size (R) / $\Sigma_{t \in T}$ size(t)) to weights-list of index I

| INDEX 540 | QUERY 550 | COST 560 |
|---|---|---|
| $I_1$ | $Q_1$ | 100 |
| $I_2$ | $Q_2$ | 10 |
| $I_3$ | $Q_3$ | 5 |
| $I_4$ | $Q_4$ | 1 |
| $I_5$ | $Q_5$ | 1 |

TOTAL COST = 117

FIG. 5B

| TABLE | INDEX | QUERY, BENEFIT | TOTAL WEIGHT |
|---|---|---|---|
| $T_1$ | $I_1 \rightarrow$ | $(Q_1, 80), (Q_2, 30)$ | 110 |
| $T_2$ | $I_2 \rightarrow$ | $(Q_1, 25), (Q_2, 20)$ | 45 |
|  | $I_3 \rightarrow$ | $(Q_1, 25)$ | 25 |
| $T_3$ | $I_4 \rightarrow$ | $(Q_2, 20)$ | 20 |

$Q_1$ REFERENCES $T_1, T_2$
$Q_2$ REFERENCES $T_1, T_2, T_3$
$Q_3$ REFERENCES $T_2$

701. Let C be the set of candidate indexes.
702. Let R be the set of indexes recommended. R = { }.
703. Let S be the total storage limit.
704. While |C|
705.     Let I be an index defined on T (I ∈ C) with the highest *total weight per unit storage*.
706.     /* Reduce weight of indexes used in the same queries as I */
707.     If Storage (R ∪ {I}) ≤ S
708.         R = R ∪ {I}
709.         For each element (Q, w) in weights-list of I
710.             For each index I' on table T that is potentially applicable for Q
711.                 If I is a covering index for Q OR I and I' are single-column indexes
712.                       Remove element for Q from weights-list of I'
713.                       If (total weight (I') = 0), C = C - {I'}
714.     C = C - {I}
715. Perform *index merging* on R to reduce storage of R without significantly increasing workload cost. Let the configuration generated be R'.
716. Evaluate R' by going to the optimizer. Eliminate unused indexes from R' to produce configuration R".
717. Perform *benefit based pruning* of indexes in R" to eliminate indexes with low benefit. Let the configuration produced be F.
718. Return F.

FIG. 7

INDEX TUNER FOR GIVEN WORKLOAD

REFERENCE TO RELATED APPLICATIONS

Co-pending patents and applications which are commonly assigned: "Database System Index Selection Using Cost Evaluation of a Workload for Multiple Candidate Index Configurations", U.S. Pat. No. 5,950,186; "Database System Index Selection Using Candidate Index Selection for a Workload", U.S. Pat. No. 5,960,423; "Database System Multi-Column Index Selection for a Workload", U.S. Pat. No. 5,913,206; "Database System Index Selection Using Index Configuration Enumeration for a Workload" U.S. Pat. No. 5,913,207; "Database System Index Selection Using Cost Evaluation of a Workload for Multiple Candidate Index Configurations" U.S. Pat. No. 5,926,813; "Index Merging for Database Systems" U.S. Pat. No. 6,169,983; "What-If Index Analysis Utility for Database Systems", Ser. No. 09/139,843, pending, are hereby incorporated by reference.

FIELD OF THE INVENTION

This invention relates generally to the field of databases, and in particular to an index tuner given a workload of queries to a database.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 2000, Microsoft Corporation, All Rights Reserved.

BACKGROUND

Databases have grown very large in size. When a user desires information, they issue a query, which asks for information, such as give me the names of people from Bozeman, Mont. with income greater than a certain amount. There may be a table containing a row for each person in the United States. Each row may have several columns, including income, social security number, street address, city, state, telephone number, names of dependents, occupation, etc. By searching this large table, a computer can find all the people in Bozeman, Mont., and then determine from that list of people, who has income greater than the specified amount. To do this search, the computer has to deal with the entire large table, retrieving it from storage into memory, and then searching row by row for the desired information.

One way to make this type of search more efficient, is to build indexes. An index makes it more efficient to retrieve a subset of data from a table required to answer a query. It helps identify subsets of rows from which further data may be required to answer the query. An index is a subset of a table, which typically contains fewer columns than the table itself. Indexes are sometimes created prior to a user query being made. Some indexes are arranged in a tree like structure, such as a $B^+$ tree, which makes finding information even faster. If an index exists that contains the data that the user desires, it is much easier to simply search the index to provide the information.

In the case of the above query, an index could be generated based on State, and then people in Montana could be quickly identified. This index would be much smaller than the table, and the answer could be provided much more quickly because the entire table does not need to be searched. An index with income can also be generated to quickly identify people with income greater than the specified amount. An index on city could also be created to quickly identify people in the city of Bozeman. In each of these cases, the table would have to be consulted absent further relevant columns in the index.

A covering index for a query may also be used. A covering index for a query is an index that is a subset of the large table, yet has at least all the columns from a table needed to answer the query. For the example query, an index having city, state, people and income columns would be a covering index because it has all the columns needed to answer the query without resort to the table. Use of this covering index would be the fastest way to answer the query. However, it is likely larger than the other indexes.

A workload is a set of queries and updates which are run against a given database. A configuration is a set of indexes used to improve performance for the workload. Given a workload of multiple queries, the decision as to which indexes to include in the configuration is very complex and time consuming. Since there is overhead associated with generating, maintaining and storing the indexes, this must be offset against the benefit obtained by using them.

A query optimizer is used to obtain information about indexes given a set of queries. Optimizers are database tools that can take a representative workload, and return information about a plan of execution of the queries in the workload, as well as information about the cost of executing the plan. The optimizer provides detailed information in the form of a tree which has nodes corresponding to a plan of execution of the query. The nodes provide information on the indexes used, and the cost of using the index. From this cost information, a user can try to determine which indexes should be built or used to enable the workload to be processed in an efficient manner.

One way of determining which set of indexes provides the most benefit given a workload is to actually propose a set of indexes, build them, and then run the workload. The total cost of the workload is then calculated. Several different sets of indexes are measured in this manner to find the best set. This is a very expensive proposition, especially when it would need to be done several times for different sets of indexes. In other prior database systems, optimizers have been run for each proposed configuration or set of indexes to try and find the best set for a given workload and database system.

This is also a costly way to try to determine which set of indexes provides the best performance of the database system. As the workload changes, the entire process must be repeated to arrive at a new set of indexes.

A further approach takes semantic information such as uniqueness, reference constraints and rudimentary statistics ("small" vs. "big" tables) and produces a database design. Such designs may perform poorly because they ignore valuable workload information. A further approach uses an expert system like approach, where the knowledge of "good" designs are encoded as rules and are used to come up with a design. This approach can take workload information into account, but is disconnected from the query optimizer. This has adverse ramifications for two reasons. First, a selection of indexes is only as good as the optimizer that uses it. In other words, if the optimizer does not consider a particular index for a query, then its presence in the database does not benefit that query. Second, the expert system operates on its own model of the query optimizer's index usage. While making an accurate model is itself hard, ensuring consistency between the tool and an evolving optimizer is a software-engineering nightmare.

In yet a further approach, an index selection tool uses the optimizer's cost estimates to compare goodness of alternative hypothetical designs. This approach avoids asynchrony between the index selection tool and the query optimizer. It further reduces the amount of indexes to consider by eliminating a large number of indexes from consideration that provide little or no benefit for any query in the workload. It also searches subsets of candidate indexes and picks a configuration with a low total cost. Multi column indexes are also generated for consideration in this approach.

There is a need for a system that can more quickly determine a set of beneficial indexes given a workload. There is a further need for a system that does not need to repeatedly call an optimizer to determine a set of beneficial indexes.

SUMMARY OF THE INVENTION

An index tuning wizard produces a fast and reasonable recommendation identifying database indexes to use given a specified workload for a given database and database server. A query optimizer is used to determine the expected usefulness of potential indexes for the specified workload by taking the cost of queries in that workload into account. A cost based pruning of indexes is then performed to provide an intermediate set of proposed indexes. The optimizer is then used again, and further pruning is done based on the expected improvement in the cost of the workload by having the index. An index is not recommended unless it has a significant impact on the workload.

A number of indexes are proposed based on the parsing of queries in the workload. A potential for improvement for a query is captured as a weight. Weights for each index are generated for corresponding queries by taking into account the cost of each query from an execution plan generated by the optimizer. The total weight of an index is the sum of all the weights for the index. Covering indexes are also given weights. Indexes with small weights below a selected threshold are dropped. Indexes are no longer dropped if the total cost of the dropped indexes exceed a predetermined threshold such as 5% of the total cost of all queries affected. Following dropping of indexes, the remaining indexes with the most impact are selected based on repeatedly selecting the highest total weight index and recalculating weights after such selection. Covering indexes are not reduced in weight during this iterative process unless a related coving index is selected. The selection of non covering indexes does not reduce the weight of a covering index to reflect their higher likelihood of being usefull in processing query workloads. Resource constraints are then used to prune the remaining indexes to produce an initial recommendation or intermediate set of proposed indexes.

The index optimizer is then used for a second time to calculate the benefit of each index. The benefit of an index is defined as the sum of all benefits (current cost— recommended cost) of each query where the index is used. Benefit based pruning is employed to ensure that a recommended configuration is better than the existing configuration and to eliminate indexes with low benefit for the workload. The total benefit to the workload is checked to determine if it is positive. If not, the proposed indexes are eliminated so that a configuration with overall negative benefit is not recommended. A final step of benefit based pruning eliminates indexes with low overall benefit. This is done in a similar manner to the iterative cost based pruning, with the total weight replaced by the total benefit. A final recommendation is then provided to a user for selection of indexes. The recommendation can also be implemented automatically.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention. This is followed by a high level description of how indexes are recommended for a given workload. Further sections provide detail on the proposing of indexes, cost based pruning, and benefit based pruning to provide a final recommended set of indexes for the workload. A conclusion discusses further embodiments and benefits which may be provided by the invention depending on the implementation.

Hardware and Operating Environment

Figure 1:
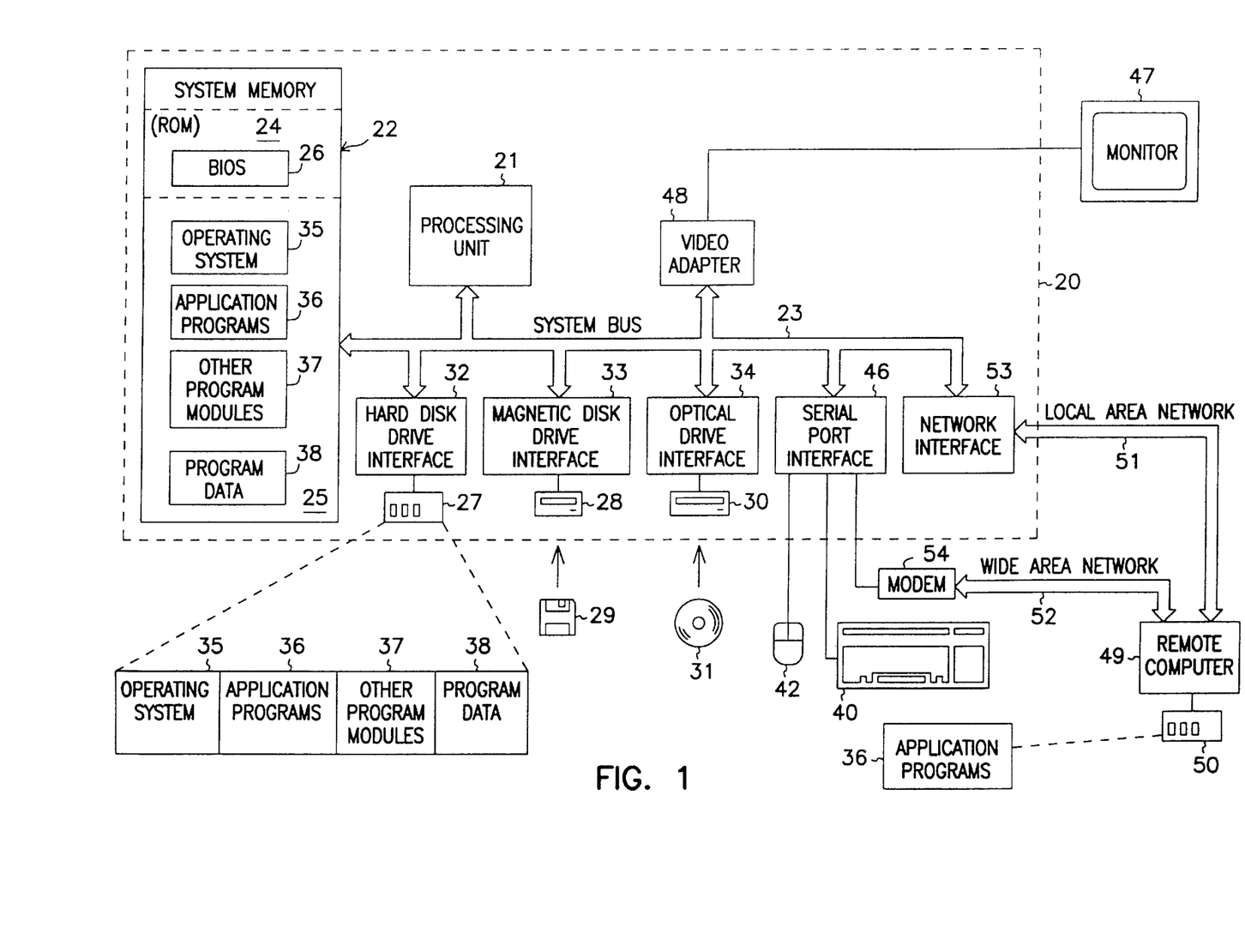
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other output devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Overview

Figure 2:
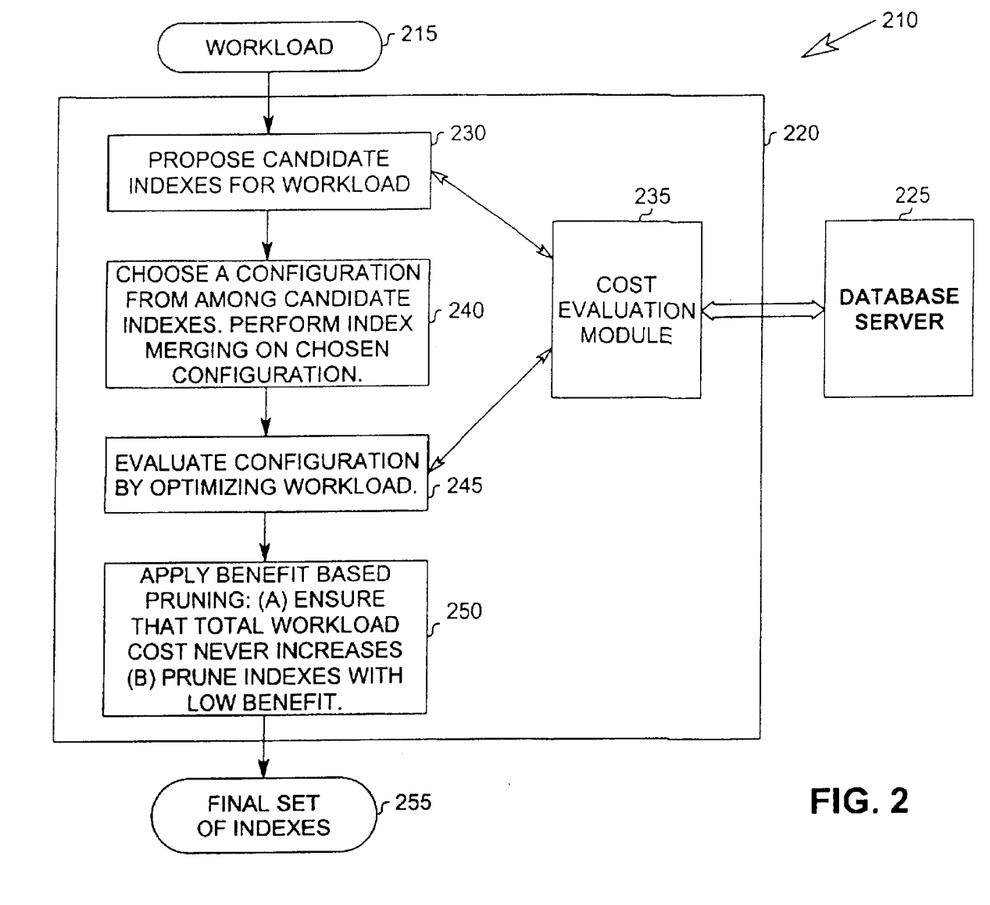
FIG. 2 is a block diagram of the architecture of an index tuner.

An index tuning facility is shown in block form in FIG. 2 generally at 210. The index tuning facility may be written in computer code, and may run on a system similar to that described with respect to FIG. 1. A workload 215 is comprised of a set of queries and updates. The workload is representative of the most common queries to a database server indicated at 225. A method referred to as wizard 220 comprises a module 230 that takes the workload and parses each individual query in the workload to identify candidate indexes that could be useful in satisfying the queries. Module 230 calls a cost evaluation module 235. Cost evaluation module 235 receives a set of queries and a configuration of indexes. It passes this information to an optimizing function in the database server 225. Database server 225 returns a plan of execution for the set of queries, and indicates the cost of each query. The optimizing function also provides parsing information as part of the plan. This results provided by the database server 225 are passed back to the candidate indexes module 230, and also includes index usage information, identifying which indexes were used to answer each query. An optimizer is further described in co-pending application: "What-If Index Analysis Utility for Database Systems", Ser. No. 09/139,843, assigned to the same assignee as the present application, and hereby incorporated by reference.

At 240, an intermediate set of indexes is chosen based on the cost of the plan. Many indexes may be removed from consideration at this point if they provide minimal benefit. Indexes are only removed up to a certain predetermined fraction of workload cost. This process is referred to as cost based pruning and helps narrow the number of indexes for further consideration. The indexes with the most potential for improvement of the cost are then selected. As each index is selected, the remaining related indexes may be decreased in cost.

At this point, the remaining set of indexes is evaluated at 245 by the optimizer via module 235. Cost per query, and index utilization information is again provided by the optimizer. This information is then provided to a benefit based pruning module 250. This module ensures that the total workload cost never increases, and prunes indexes with low benefit. Finally, a set of indexes is returned at 255. They are only provided in one embodiment if they clearly provide a decrease in cost over the existing set of indexes. The final set of indexes may be used by a user to create new indexes and modify the set of indexes for use by the database server 225 to enhance performance. The user may initiate this action, or be provided a graphical user interface. Further, the system could actually automatically provide the recommended final set of indexes to the database server 225 for automatic implementation.

In one embodiment, certain restrictions are applied to reduce the number of potential indexes considered. Only single column indexes, covering indexes, and foreign key indexes are considered. A single column index is an index that comprises one column of a table. A covering index is an index having multiple columns that can provide all the information from the table required to satisfy a query. An example might be an index which has a sales column and a company name column. From this index, one can answer a query such as a request for all companies having sales greater than a specified amount. Rather than loading an entire table, which may have many more columns, only the covering index need be used to satisfy the query. A foreign key index is an index having a column which can be used to find a common row in another table. One common example of a foreign key is a table having a customer ID column, which can then be joined with another table having a customer ID column.

Some restrictions are imposed on which indexes will be considered in order to make the index selection process run faster. The restrictions below are selected from more advanced features of an SQL server, which require a higher overhead. In addition, their inclusion would significantly increase the complexity of the index selection process. Different servers will have different sets of such features, and the exclusion of features may be made based on a cost/benefit analysis. Each of the restrictions may be removed, but at a potential increase in the running time. The restrictions include:

1. No new clustered indexes are proposed.
2. No new materialized views (pre-computed queries) are proposed.
3. All existing indexes are retained.
4. Indexes are proposed only for the most expensive queries that constitute 15% of the workload. This percentage may also be varied as desired.

Figure 3:
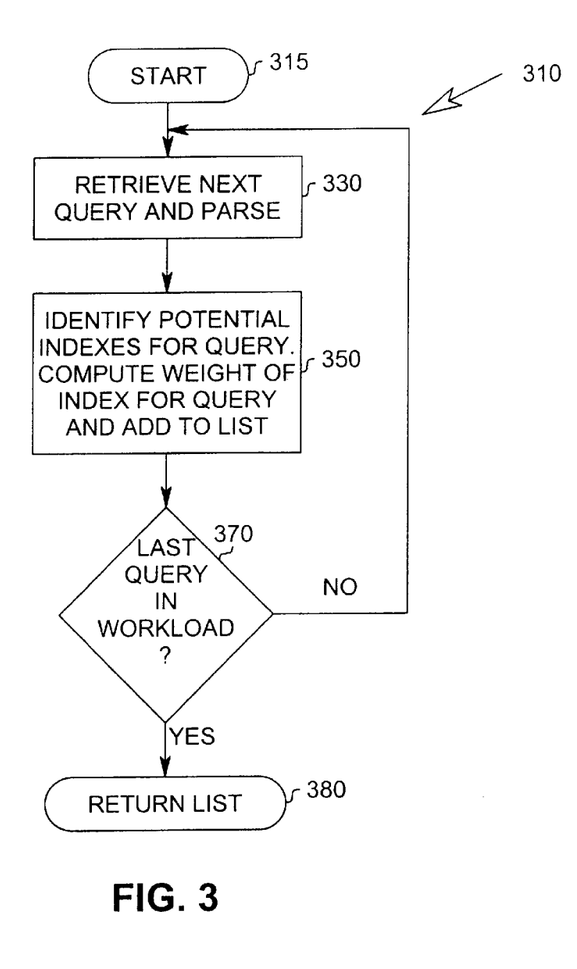
FIG. 3 is a flow chart showing selection of indexes for a given workload.

In proposing candidate indexes, a single-column index R.a is proposed if R.a is an indexable column in one or more queries in the workload. R.a corresponds to table R and column a. An indexable column of a query is a column that is referenced in a WHERE clause, GROUP BY clause, ORDER BY clause, or HAVING clause of a query. FIG. 3 shows the flow of identifying potential indexes generally at 310. Starting at 315, the next query is retrieved and parsed. At 350, the indexes are identified. The weight of each index is computed per query, and the index is added to a list of potential indexes. The list may than be reviewed to determine which indexes meet the above restrictions, or each index may be reviewed relative to the restrictions prior to being placed on the list of potential indexes.

With each proposed index, a weights-list is associated. The weights-list comprises one or more (query, weight) pairs, each representing the weight, w, of the index for the query, Q. The weight of an index I on table T for a query Q where the index is potentially applicable is determined as follows:

w=Cost (Q, current)*size (T)/sum of sizes of all tables referenced in Q, where Cost (Q, current) is the optimizer estimated cost of the query for the current configuration. The total weight of an index is the sum of all weights in the weights-list of the index.

Figure 4:
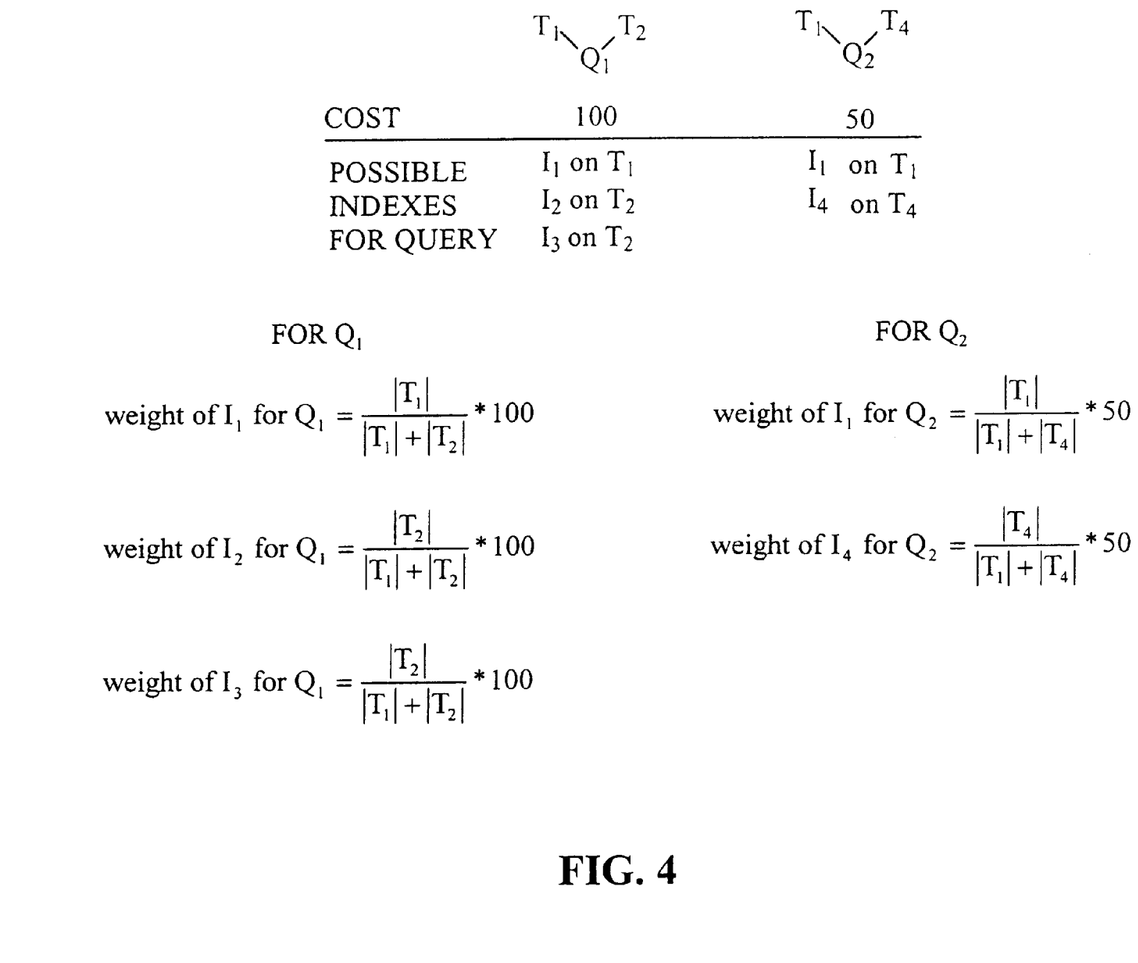
FIG. 4 is pseudocode showing a method of proposing candidate indexes for a workload.

FIG. 4 is a table that illustrates computation of the weights for each index. Index $I_1$ is defined on table $T_1$. Indexes $I_2$ and $I_3$ are defined on table $T_2$. Index $I_4$ is defined on table $T_4$. Index $I_1$ is useful for both queries, $Q_1$ and $Q_2$, so it has two weights as shown in the formulas for the weights of $I_1$. The weights of indexes useful for $Q_1$ are multiplied by 100, the cost of the query. The weights for indexes useful for $Q_2$ are multiplied by 50, the cost of the query.

Figure 5A:
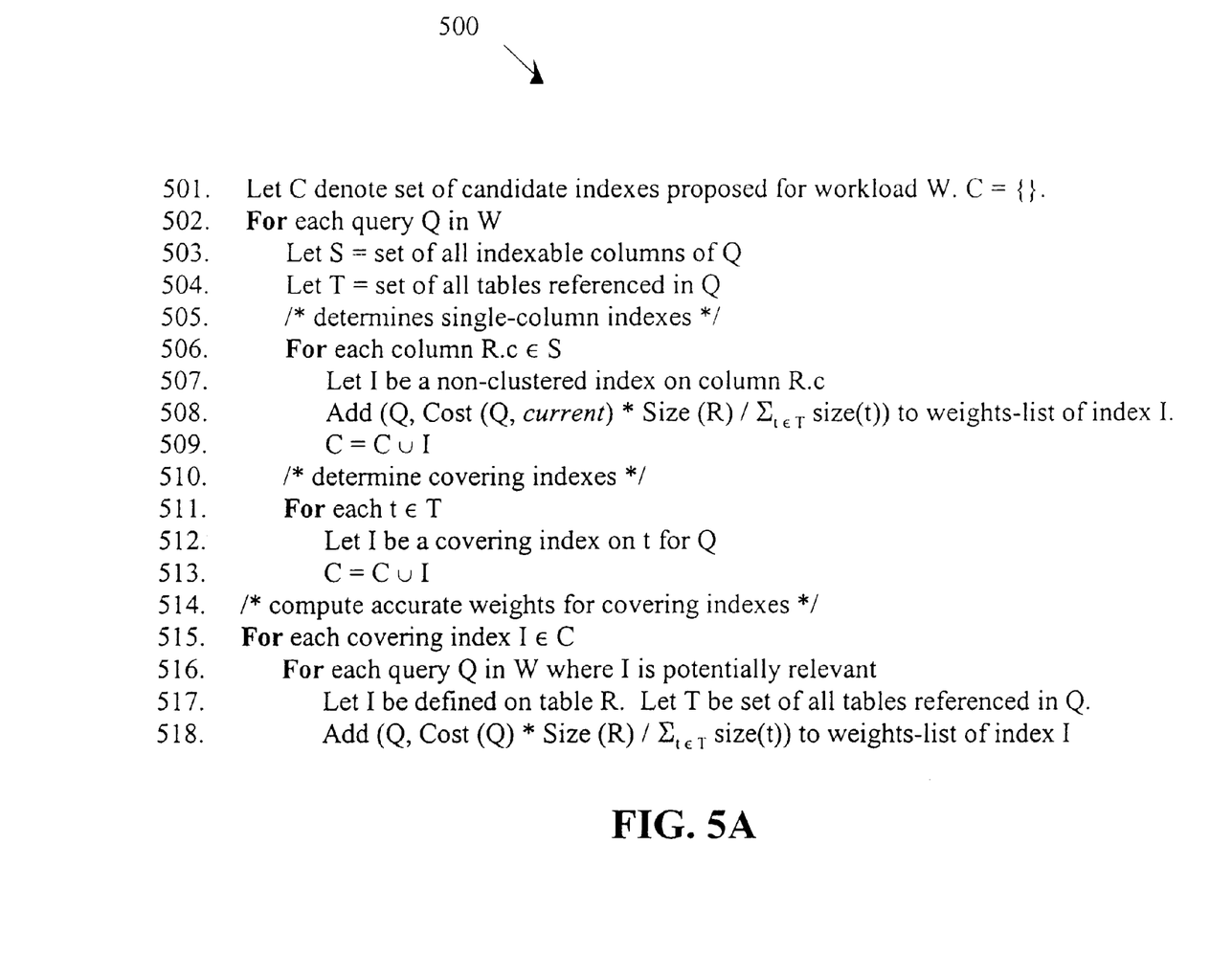
FIG. 5A is a table showing usefulness of indexes for each query.

FIG. 5A contains pseudocode, indicated generally at 500, for proposing candidate indexes for a workload. At 501, C denotes a set of candidate indexes proposed for the workload W. Several steps are performed for each query Q in W starting at 502. At 503, S is defined as the set of all indexable columns of Q. At 504, T is defined as the set of all tables referenced in Q.

Comment 505 indicates that single column indexes will be determined. At 506, several steps will be performed for each column R.c being an element of S. For a single-column index that is applicable in more than one query, 507 ensures that the weight of the index for each such query is computed at 508. At 509 the index is added to the set of candidate indexes. At 510, 511, 512 and 513, covering indexes are identified and added to the set of candidate indexes, C. A covering index is applicable whenever it contains a superset of the columns required to answer a query. Comment 514 marks the start of computing accurate weights for covering indexes. At 515, 516, 517, and 518, it is ensured that the weight of each covering index is accurately computed, essentially as performed for single column indexes. However, larger covering indexes for different queries are not considered at this point. The result of executing the algorithm is a set of candidate indexes C, where each index, I is an element of the set C and has associated cost per query information.

Even though the space of indexes is restricted to single-column, foreign key and covering indexes, for a large or complex workload, there can be many possible candidate indexes. The usefulness of an index for a query is determined by whether or not it is used by the optimizer to answer the query. A cost based pruning of the indexes is done to ensure that too many spurious indexes are not considered. Indexes that can affect only a small fraction of the total workload cost are eliminated without adversely affecting the quality of the final recommendation. Using cost based pruning, all indexes that are not relevant in more than a predetermined fraction (x) of the total cost of the workload, i.e., total weight of index I total cost of workload is less than x. In one embodiment, x is approximately 0.01. It may be varied by the user as desired, or set to a different value to begin with. For certain workloads, it is possible that all or most indexes fall below the threshold of x. To guard against too many indexes being pruned, they are pruned in order of increasing weight until the total cost of all queries affected by the eliminated indexes exceeds a predetermined fraction (y) of the total workload cost. In one embodiment y is set at approximately 0.05. Other values may be used as desired.

Figure 5B:
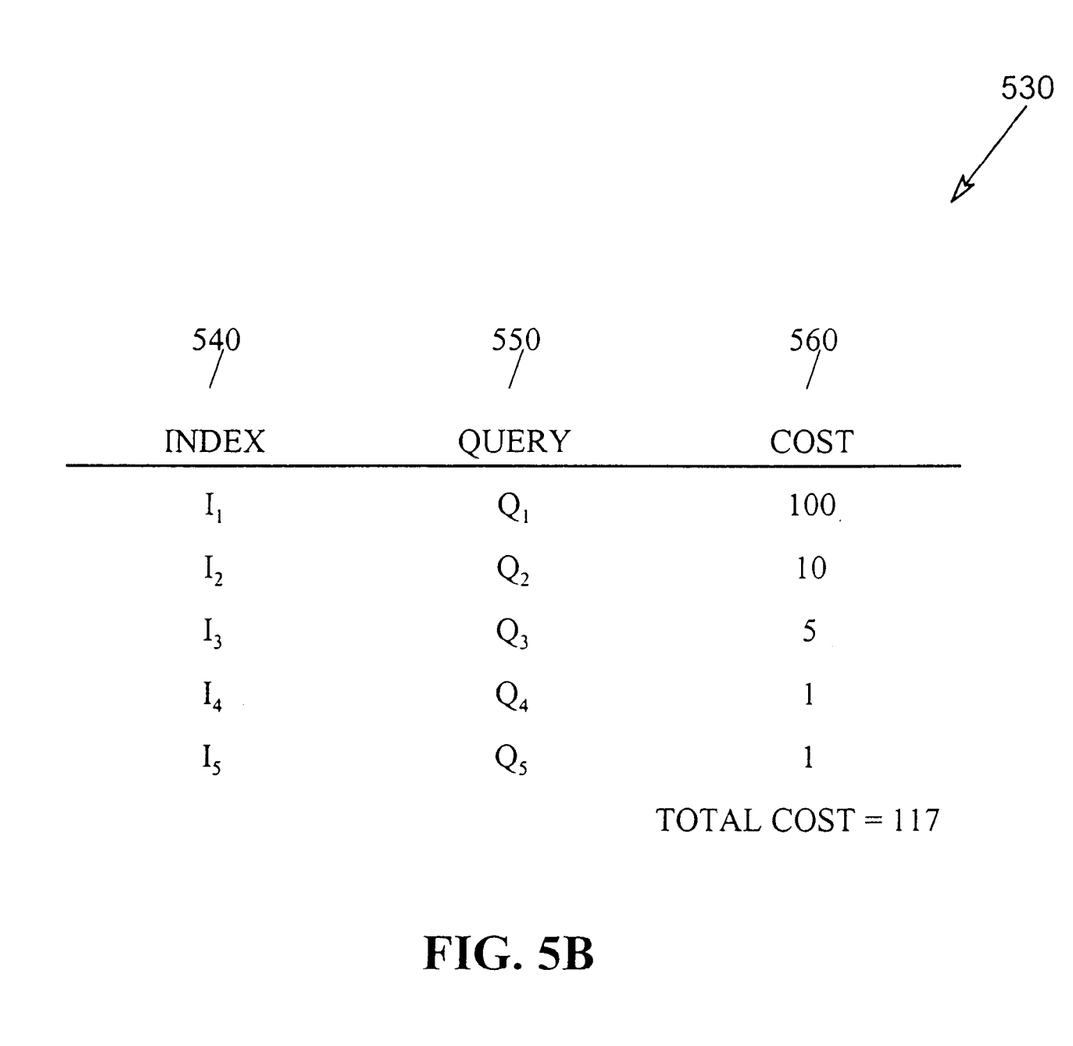
FIG. 5B is a table showing pruning of indexes for a workload.

An example of cost based pruning is shown in table form indicated generally at 530 in FIG. 5B. Indexes in a column 540 are associated with queries in column 550 and a cost in column 560. For simplicity, each index corresponds to a different query having the same subscript. The total cost of the workload is 117. Indexes $I_4$ and $I_5$ both have costs of one, which are less than one percent of the total cost of the workload. Both $I_4$ and $I_5$ are pruned because the sum of their costs is also less than five percent of the total cost of the query. Index $I_3$ has a cost of five, which is greater than the one percent threshold, so it is not pruned. Indexes $I_1$ and $I_2$ are also not pruned because their costs are greater than one percent.

Figure 6:
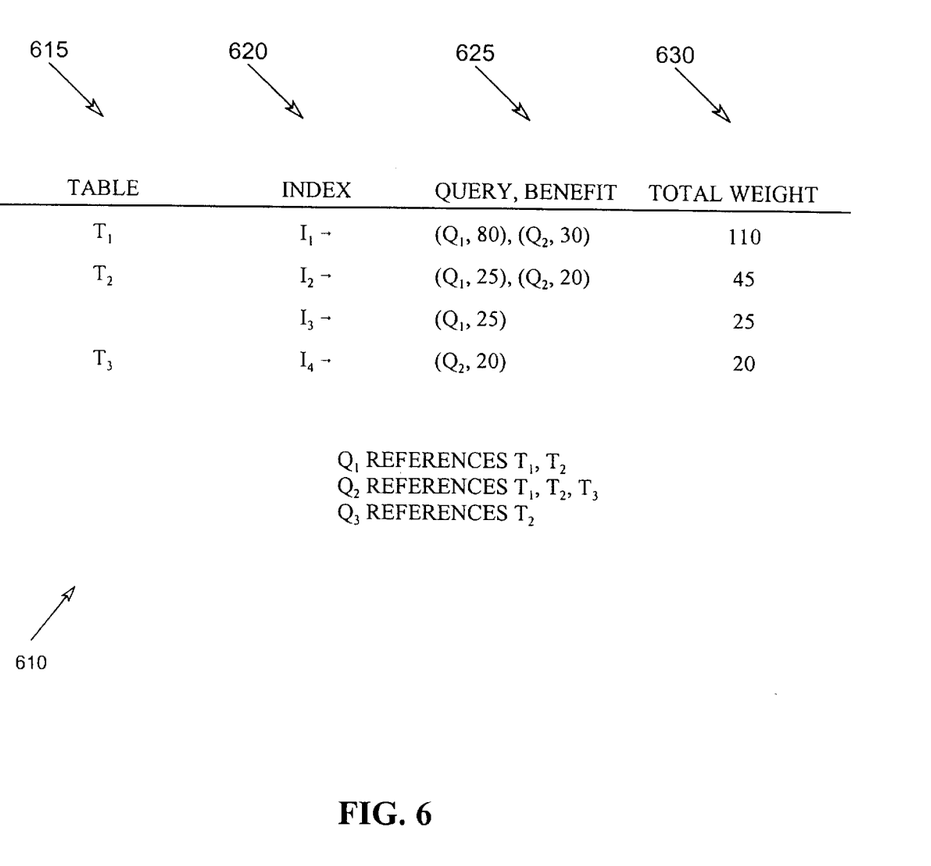
FIG. 6 is pseudocode showing a method of selecting a final recommendation of indexes.

A greedy selection of indexes to form a set of recommended indexes is partially illustrated in table 610 of FIG. 6. Table 610 comprises columns identifying tables 615, indexes 620, query benefit pairs 625, and total weight 630. Query $Q_1$ references tables $T_1$ and $T_2$. $Q_2$ references tables $T_1$, $T_2$, and $T_3$. Query $Q_3$ references table $T_2$. Index $I_1$ is associated with table $T_1$, indexes $I_2$ and $I_3$ are associated with table $T_2$. Index $I_4$ is associated with table $T_3$. As can be seen, Index $I_1$ is used for $Q_1$ and $Q_2$, with benefits of 80 and 30, for a total weight of 110. Index $I_2$ is used for $Q_1$ and $Q_2$, with benefits of 25 and 20, for a total weight of 45. Index $I_3$ is used for $Q_1$, with benefit of 25, and a total of 25. Index $I_4$ is used for $Q_2$ with a benefit of 20 and total weight of 20.

The greedy selection occurs by adding the index with the highest weighting to the set of recommended indexes. In this case, clearly index $I_1$ with a total weight of 110 is the highest weighted index. After selecting $I_1$, no affect on other indexes is noted. The next index with the highest weight is $I_2$ with a weight of 45. In this case, index $I_3$ is affected, since it is defined on the same table $T_2$ and it relates to the same query, $Q_1$. The weight of that pair is then set to zero, and the index is dropped from consideration because its total weight is then zero. The next highest weight index is then $I_4$ with weight of 20.

By use of greedy selection, the weight of indexes on the same table for the same query are reduced. With respect to covering indexes, the weight of other covering indexes is only reduced if a covering index on the same table for the same query is selected, and not when non-covering indexes are selected.

Figure 7:
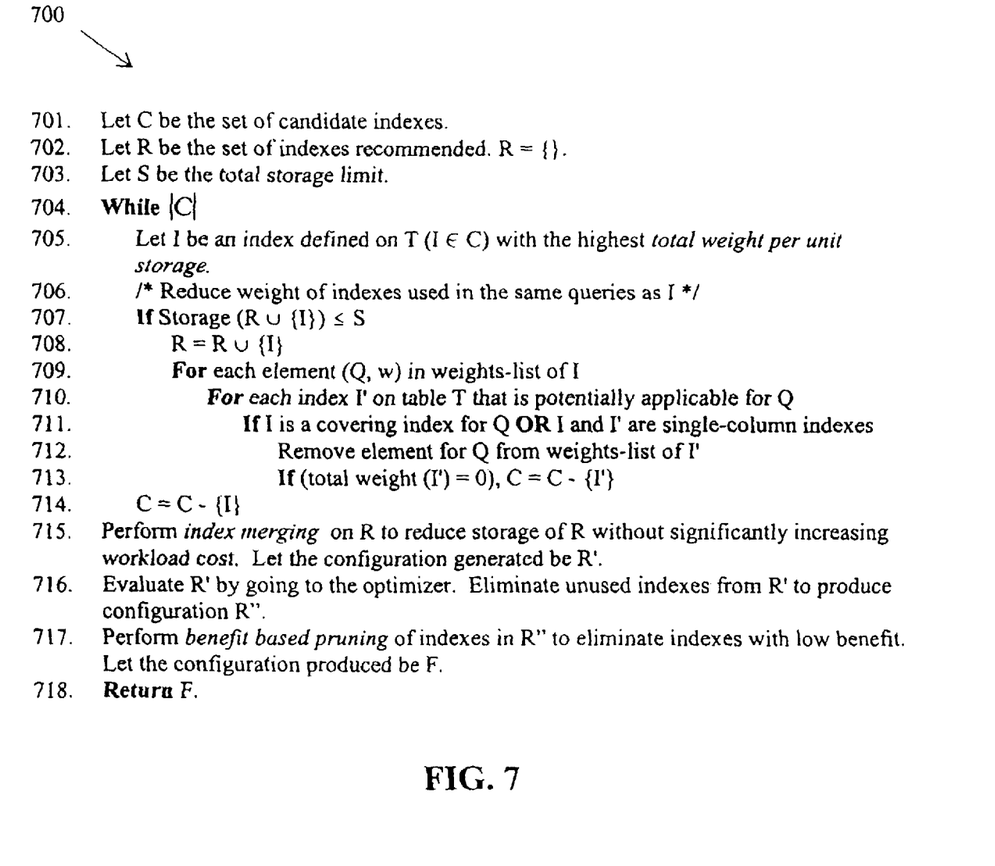
FIG. 7 is a table of benefits of indexes used to illustrate benefit based pruning.

Further details of the greedy selection process are shown with respect to the pseudocode in FIG. 7 generally at 700. C is defined as the set of candidate indexes at 701. R is defined as the set of indexes recommended at 702, and S is defined as the total storage limit, which may be set by the user. In each iteration of lines 704, 705, 706, 707, 708, 709, 710, 711, 712, 712 and 714, the index with the highest total weight per unit storage (i.e., total-weight of index/size of index) is selected. Line 704 indicates that the succeeding lines should be performed for each candidate index. At 705, the index with the highest weight is selected.

Line 706 is a comment indicating that the weight of indexes used in the same queries are to be reduced. At 707, storage constraints are taken into account. As previously mentioned, the storage limit S is determined by the user, or the users system as desired. It is a limit on the total storage taken by indexes. Other constraints, such as the total cost of updating or generating indexes may additionally or alternatively be considered. When the last index pushes the storage requirements or other constraint over the limit, lines 708–713 are not performed. If the limit has not been exceeded, the index is added to the recommended set R at 708. When an index I on table T is selected, the total weight of each index I' on T is reduced such that both I and I' were potentially applicable for a query Q at lines 708–712. The total weight of I' is reduced by the cost of the query Q. If the total weight of an index becomes 0, it is removed from the set of candidate indexes, C. An assumption is thus made that at most, "one index per table per query" is used to answer the query. Thus, at 709, elements in the weights list of I are considered. For each index I' on table T that is potentially applicable for Q at 710, if I is a covering index for Q, or I and I' are single-column indexes as determined at 711, the element for Q is removed from the weights list of I' as shown above with respect to FIG. 6. If the total weight of I' is zero, then it is removed from the set of candidate indexes at 713. At 714, the index I is removed from the set of candidate indexes because it has been selected, or because it did not meet the storage constraints of 707.

At 715, index merging is performed on the set of recommended indexes R to reduce the storage of R without significantly increasing workload cost. The configuration generated from the merging function is referred to as R'. Merging functionality has been performed in other systems, so is not described in further detail herein. Co-pending application "Index Merging for Database Systems" Ser. No. 09/087,617 is hereby incorporated by reference.

At 716, the resulting configuration R' is then evaluated for the workload by optimizing each query in the workload. As a result of this evaluation, the cost of each query is and indexes used by the optimizer to answer each query is determined. The cost of updating indexes is also obtained. Indexes are eliminated from R' if they are never used by the optimizer to answer any query in the workload. The resulting set of indexes is referred to as R". Finally, at 717, a benefit based pruning to R" is used to produce the final configuration, F. This final configuration is returned to the user at 718.

At least two goals of benefit based pruning result. When the workload has updates, it is ensured that a configuration worse than the existing configuration is not recommended. Also, indexes with low benefit for the workload are eliminated. The benefit of a query is defined as Cost (Q, current)—Cost (Q, R"). The total benefit of an index is defined as the sum of the benefits of all queries where the index is used. If the workload consists of updates, indexes whose elimination is guaranteed to have an overall positive impact on the workload cost are identified. This analysis is restricted to indexes having the property that for all queries where the index is used, it is the only index used. It should be noted that this index may be used in conjunction with existing indexes, i.e., indexes in the current configuration. The above only requires that none of the newly proposed indexes be also used in the same query. For such an index, it is eliminated if the total cost of updating the index exceeds the benefit of all queries where this index is used. When such an index is eliminated, the cost of a query where this index was used becomes the current cost: Cost (Q, current). After eliminating indexes with overall negative cost, it is determined whether the total benefit of the workload is positive. If not, all indexes that were updated at line 716 are eliminated. This ensures that a configuration with overall negative benefit is not recommended.

The final step of benefit based pruning is to eliminate indexes with low overall benefit. This step is identical to the cost based pruning method previously described, except that the total cost of the workload is replaced with the total benefit of the workload and the total weight of an index is replaced with the total benefit of an index. Therefore, indexes with benefit less than the predetermined fraction x of the total benefit are eliminated, subject to the termination condition that the total benefit is never reduced below a fraction exceeding y. The values of x and y are the same as those used in the cost based pruning method in one embodiment. In further embodiments, the values may be varied, and varied differently from those used in the cost based pruning method. When an index is eliminated, for purposes of reporting the overall expected improvement and for the analysis reports, it is conservatively assumed that the cost of the query where the index was used reverts to Cost (Q, current configuration).

The final configuration, F, is provided to the user in a manner that can be viewed. The configuration may be used by a user or system administrator to modify the set of indexes used to satisfy a given workload. It can also be provided directly to the database server for use in generating a new set of indexes for a given workload. While the final configuration, or set of recommended indexes may not be the best possible, the fact that they were obtained comparatively cheaply and quickly, and that they are an improvement over the current set provides significant utility. It provides a quick set of indexes when a workload changes, or when bringing new applications on line for testing. It does not depend on an application actually running to help identify useful indexes.

CONCLUSION

An index tuning program provides a fast and reasonable recommendation identifying database indexes to improve performance of a database system given a specified workload. A query optimizer is used to determine the expected usefulness of potential indexes for the specified workload by taking the cost of queries in that workload into account. A cost based pruning of indexes is then performed to provide an intermediate set of proposed indexes. The optimizer is then used again, and further pruning is done on a benefits basis. An index is not recommended unless it has a significant impact on the workload. Both the cost and benefit have been represented as being determined by an optimizer. In further embodiments, historical data may also be used to provide cost and benefit information. Further the precise greedy algorithms used may be modified in any manner desired to provide different methods of selecting indexes to keep or throw away.

This application is intended to cover any adaptations or variations of the present invention. It is manifestly intended that this invention be limited only by the claims and equivalents thereof.

What is claimed is:

1. A computer implemented method of identifying a set of indexes for a given workload on a database, the method comprising:

identifying potential indexes based on queries in the given workload;

obtaining cost and usage information with respect to the potential indexes for calculating a weight;

performing cost based pruning to eliminate low usage indexes;

selecting indexes having most benefit satisfying specified constraints;

obtaining cost and index usage of the selected indexes for calculating a benefit;

performing benefit based pruning to eliminate indexes with low benefit; and providing a final recommendation of a set of indexes.

2. The method of claim 1 wherein merging of indexes is performed after the cost based pruning.

3. The method of claim 1 wherein the cost based pruning eliminates indexes that are not relevant in more than a predetermined fraction (x) of the total cost of the workload.

4. The method of claim 3 wherein indexes are pruned based on increasing order of total weight, and wherein no more indexes are pruned when the total cost of all queries affected by the eliminated indexes exceeds a predetermined fraction (y) of the total workload cost.

5. The method of claim 4 wherein x is approximately equal to 0.01, and y is approximately equal to 0.05.

6. The method of claim 1 wherein weights are generated for each proposed index based on the sum of weights for each query for which the index is useful.

7. The method of claim 6 wherein a total weight of an index is the sum of all the weights, each of which is proportional to the size of the table from which the index is generated.

8. The method of claim 1 wherein the cost based pruning comprises eliminating indexes with low cost.

9. The method of claim 1 and further comprising an iteratively selecting the highest weight index, and recalculating the weights of the remaining indexes.

10. The method of claim 1 wherein the benefit based pruning comprises eliminating indexes with low benefit.

11. The method of claim 1 wherein the constraints are based on storage resources.

12. The method of claim 1 wherein a total benefit of the recommended set of indexes is calculated, and if it is negative, the set is not recommended.

13. The method of claim 1 wherein the proposed indexes are selected from the group consisting of single column indexes, covering indexes and foreign key indexes.

14. The method of claim 1 wherein indexes are considered if a column in a table is referenced in a WHERE clause, a GROUP BY clause, an ORDER BY clause or a HAVING clause of a query.

15. A computer readable medium having instructions stored thereon for causing a computer to perform a method of identifying a set of indexes for a given workload on a database, the method comprising:

identifying potential indexes based on queries in the given workload;

obtaining cost and usage information with respect to the potential indexes for calculating a weight;

performing cost based pruning to eliminate low usage indexes;

selecting indexes having most benefit satisfying specified constraints;

obtaining cost and index usage of the selected indexes for calculating a benefit;

performing benefit based pruning to eliminate indexes with low benefit;

providing a final recommendation of a set of indexes.

16. The method of claim 15 wherein the cost based pruning eliminates indexes that are not relevant in more than a predetermined fraction (x) of the total cost of the workload.

17. The method of claim 16 wherein indexes are pruned based on increasing order of total weight, and wherein no more indexes are pruned when the total cost of all queries affected by the eliminated indexes exceeds a predetermined fraction (y) of the total workload cost.

18. The method of claim 17 wherein x is approximately equal to 0.01, and y is approximately equal to 0.05.

19. The method of claim 15 wherein weights are generated for each proposed index based on the sum of weights for each query for which the index is useful.

20. The method of claim 19 wherein a total weight of an index is the sum of all the weights, each of which is proportional to the size of the table from which the index is generated.

21. The method of claim 16 wherein the cost based pruning comprises eliminating indexes with low cost.

22. The method of claim 15 and further comprising iteratively selecting the highest weight index, and recalculating the weights of the remaining indexes.

23. The method of claim 15 wherein the benefit based pruning comprises eliminating indexes with low benefit.

24. The method of claim 15 wherein the constraints are based on storage resources.

25. A system for identifying a set of indexes for a given workload on a database, the system comprising:

a module for proposing candidate indexes for a workload of queries;

a cost basis pruning module that prunes indexes on a cost basis;

an index selection module that selects indexes having most benefit based on constraints; and a benefit basis pruning module that prunes indexes on a benefit basis.

26. The system of claim 25 and further comprising a merge module that merges indexes remaining after they have been pruned on a cost basis.

27. The system of claim 25 wherein cost based pruning eliminates indexes that are not relevant in more than a predetermined fraction (x) of the total cost of the workload.

28. The system of claim 27 wherein indexes are pruned based on increasing order of total weight, and wherein no more indexes are pruned when the total cost or benefit of all queries affected by the eliminated indexes exceeds a predetermined fraction (y) of the total workload cost or benefit.

29. The system of claim 28 wherein x is approximately equal to 0.01, and y is approximately equal to 0.05.

30. The system of claim 25 and further comprising a cost evaluation module for interfacing with an optimizer of a database server which generates weights for each index based on the sum of weights for each query for which the index is useful.

31. The system of claim 30 wherein a total weight of an index is the sum of all the weights, each of which is proportional to the size of the table from which the index is generated.

32. The system of claim 25 wherein the cost based pruning comprises eliminating indexes with low cost.

33. The method of claim 25 and further comprising iteratively selecting the highest weight index, and recalculating the weights of the remaining indexes.

34. The method of claim 25 wherein the benefit based pruning comprises eliminating indexes with low benefit.

35. The method of claim 34 wherein the benefit of covering indexes is not recalculated unless another covering index is selected.

36. A computer implemented method for identifying a set of indexes for a given workload on a database, the method comprising:

proposing candidate indexes for a workload of queries;

pruning indexes on a cost basis;

selecting indexes based on constraints; and pruning indexes on a benefit basis to provide a set of recommended indexes.

37. A computer readable medium having instruction stored thereon for causing a computer to perform the method of claim 36.

38. A computer system for identifying a set of indexes for a given workload on a database, the system comprising:

a module for identifying potential indexes based on queries in the given workload;

a module for obtaining cost and usage information with respect to the potential indexes for calculating a weight;

a module for performing cost based pruning to eliminate low usage indexes;

a module for selecting indexes having most benefit satisfying specified constraints;

a module for obtaining cost and index usage of the selected indexes for calculating a benefit;

a module for performing benefit based pruning to eliminate indexes with low benefit; and a module for providing a final recommendation of a set of indexes.

* * * * *